Patented Aug. 10, 1943

2,326,373

UNITED STATES PATENT OFFICE 2,326,373

ALKOXY ACRYLONITRILES AND PROCESS OF PREPARING THE SAME

John R. Long, Akron, Ohio, assignor to Wingfoot Corporation, Akron, Ohio, a corporation of Delaware No Drawing. Application June 25, 1941, Serial No. 399,677

10 Claims. (Cl. 260—464)

This invention relates to certain new compounds of unsaturated nature and to a method of preparing the same. More particularly, it relates to substituted nitriles of the acrylic series and of the propionic series.

Investigations looking to the discovery of compounds suitable in polymerizations have led to the preparation of certain substituted acrylonitriles which are new. In the course of this preparation, substituted propionitriles are produced which are also new. Both the acrylonitriles and the propionitriles carry an oxygen-containing substituent and hence, the new compounds consist of acrylonitriles and propionitriles substituted in the alpha position by an aliphatic oxy group.

The new compounds include such acrylonitriles as alpha methoxy acrylonitrile, alpha ethoxy acrylonitrile, alpha n-propoxy acrylonitrile, alpha isopropoxy acrylonitrile, alpha n-butoxy acrylonitrile, alpha isobutoxy acrylonitrile, alpha n-amyloxy acrylonitrile and alpha isoamyloxy acrylonitrile. Propionitriles included are, for example, beta brom, alpha methoxy propionitrile, beta brom, alpha ethoxy propionitrile, etc.

The new compounds can be prepared by first treating an alpha beta dibromo dialiphatic ether with a cyanide to replace one atom of bromine with a nitrile radical to form an alpha cyano beta bromo ether or beta bromo, alpha (aliphatic oxy) propionitrile. This cyano ether is then treated with a dehydrobrominating agent, such as pyridine or quinoline, to remove hydrogen bromide, thus leaving the final product, an alpha (alphatic oxy) acrylonitrile. Employing cuprous cyanide in the first step and pyridine in the second step, the equations for the reactions are as follows:

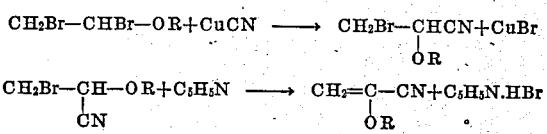

To illustrate the process, the following examples are given:

EXAMPLE 1

*Beta brom alpha ethoxy propionitrile*

To a suspension of 147 grams of CuCN and 300 cc. of anhydrous ethyl ether was added, with stirring, over a period of one hour and 20 minutes, 378 grams of alpha, beta dibromethyl ethyl ether. The mixture was stirred and refluxed for another hour and 40 minutes. After the ether was distilled off, the crude product was distilled out of the reaction mixture under reduced pressure. Fractionation of the distillate gave 219.7 grams of beta brom, alpha ethoxy propionitrile,

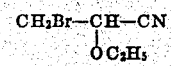

having the following properties:

B. P. (6 mm.) = 75–77° C.;
$d_{24} = 1.4252$; $N_D^{22} = 1.4602$.

EXAMPLE 2

*Alpha ethoxy acrylonitrile*

There was taken 178 grams of the product prepared above, beta brom, alpha ethoxy propionitrile, which was mixed with 100 grams of pyridine and 2.0 grams of diphenyl para phenylene diamine (antioxidant). The mixture was heated for 1½ to 2 hours on a steam bath in a flask fitted with a reflux condenser. At the end of this period, the product was distilled out of the reaction mixture under reduced pressure and was washed with dilute hydrochloric acid to remove unreacted pyridine. The crude product was dried and fractionated under reduced pressure to obtain a yield of 67 grams of alpha ethoxy acrylonitrile,

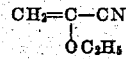

The substance had the following properties:

B. P. 45 mm.) = 55–58° C., B. P. (744 mm.) = 132–3° C., $d_{22} = 0.9065$; $n_D^{29} = 1.4150$.

EXAMPLE 3

*Beta brom, alpha methoxy propionitrile*

In accordance with the procedure followed in Example 1 above, 773.5 grams of alpha, beta dibromethyl methyl ether was reacted with 319 grams of CuCN. A yield of 337.2 grams of crude beta brom, alpha methoxy propionitrile was obtained having the formula

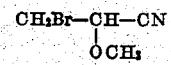

The main portion distilled at 75–76° C./7 mm.; had a density of $d_{27} = 1.5410$; and an index of refraction of $n_D^{27} = 1.4658$.

EXAMPLE 4

*Alpha methoxy acrylonitrile*

To 158 grams of the beta brom, alpha methoxy propionitrile obtained in Example 3 was added 103 grams of pyridine and the reaction conducted in the same manner as that described in Example 2. There was obtained 52.2 grams of alpha methoxy acrylonitrile:

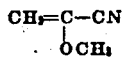

having the following properties:

B. P. (50 mm.) = 48–51° C., B. P. (744 mm.) = 121–122° C.; $d_{27}=0.9295$; $n_D^{28}=1.4108$.

EXAMPLE 5

*Beta brom, alpha butoxy propionitrile*

A mixture of 735 grams of alpha, beta dibromethyl n-butyl ether and 185 grams of CuCN was reacted in the manner employed in Example 1 above. A yield of 331 grams of product was obtained, of which the main portion distilled at 100° C./6 mm. The product was beta brom, alpha n-butoxy propionitrile:

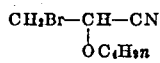

having the following properties:

$d_{27}=1.2925$; $n_D^{28}=1.4580$.

EXAMPLE 6

*Alpha n-butoxy acrylonitrile*

To 316 grams of the product obtained in Example 5, beta brom, alpha n-butoxy propionitrile, was added 154 grams of pyridine and the procedure described in Example 2 was followed to obtain 103.4 grams of product. This was alpha n-butoxy acrylonitrile,

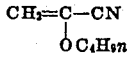

having the following characteristics: B. P. 84–86° C. 30 mm.; $d_{25}=0.8863$; $n_D^{25}=1.4722$.

All of the compounds described in Examples 1–6 inclusive are new. The class includes as well other alpha (aliphatic oxy) nitriles of the acrylic series, especially the alpha alkoxy acrylonitriles, and other alpha (aliphatic oxy) beta halo propionitriles, particularly the alpha alkoxy beta brom propionitriles such as beta brom alpha propoxy propionitrile. All of these may be prepared by one or the other of the above procedures or modifications thereof.

While there have been described above the preferred embodiments of the invention, it will be apparent to those skilled in the art that various modifications and changes may be made therein without departing from the spirit of the invention or from the scope of the appended claims.

I claim:
1. The alpha (aliphatic oxy) acrylonitriles.
2. The alpha alkoxy acrylonitriles.
3. Alpha ethoxy acrylonitrile.
4. Alpha methoxy acrylonitrile.
5. Alpha n-butoxy acrylonitrile.
6. A method of preparing alpha alkoxy acrylonitriles which comprises treating an alpha, beta dibromo ethyl alkyl ether with a cuprous cyanide and then treating the resulting beta bromo alpha alkoxy propionitrile with a dehydrobrominating agent.
7. A method of preparing alpha alkoxy acrylonitrile which comprises treating an alpha, beta dibromo ethyl alkyl ether with cuprous cyanide and then treating the resulting beta bromo alpha alkoxy propionitrile with a tertiary amine.
8. A method of preparing alpha ethoxy acrylonitrile which comprises treating alpha, beta dibrom ethyl ethyl ether with cuprous cyanide, treating the resulting beta brom alpha ethoxy propionitrile with pyridine and separating the alpha ethoxy acrylonitrile.
9. In a method of preparing alpha alkoxy acrylonitriles, the step which comprises treating a beta bromo alkoxy propionitrile with a dehydrobrominating agent.
10. In a method of preparing alpha alkoxy acrylonitriles, the step which comprises treating a beta bromo alpha alkoxy propionitrile with a tertiary amine to split out hydrogen bromide.

JOHN R. LONG.